US006793813B1

(12) United States Patent
Ethridge et al.

(10) Patent No.: US 6,793,813 B1
(45) Date of Patent: Sep. 21, 2004

(54) SEALED FILTRATION SYSTEM

(76) Inventors: Oscar H. Ethridge, 1215 Americana Dr., Birmingham, AL (US) 35215; Charlotte S. Ethridge, 1215 Americana Dr., Birmingham, AL (US) 35215

( * ) Notice: Subject to any disclaimer, the term of this patent is extended or adjusted under 35 U.S.C. 154(b) by 90 days.

(21) Appl. No.: 10/280,859

(22) Filed: Oct. 28, 2002

(51) Int. Cl.[7] .......................... B01D 35/30; B01D 50/00
(52) U.S. Cl. .................. 210/169; 210/170; 210/220; 210/287; 210/335; 210/339; 210/416.1; 210/416.2; 210/435; 210/446; 210/451; 210/501
(58) Field of Search ................................ 210/169, 170, 210/220, 287, 335, 339, 416.1, 416.2, 435, 446, 451, 501

(56) References Cited

U.S. PATENT DOCUMENTS

D243,458 S    2/1977  Pall
4,257,791 A   3/1981  Wald
4,276,265 A   6/1981  Gillespie
4,657,672 A * 4/1987  Allen .......................... 210/94
5,147,533 A   9/1992  Lipshultz et al.
5,374,351 A  12/1994  Bolton et al.
6,117,672 A   9/2000  Breckenridge

OTHER PUBLICATIONS

Internet page http://www.csd.net/ cgadd/aqua/wetdry, "Chucks Planted Aquarium Pages", Chuck Gadd, 2000.*

* cited by examiner

Primary Examiner—Robert A. Hopkins
(74) Attorney, Agent, or Firm—Donald R. Schoonover

(57) ABSTRACT

A sealed filtration system includes a housing, having two chambers, that can be submerged. One chamber houses a plurality of subchambers in which various filter media are located, and the other chamber houses a submersible pump or additional filer media. A drain chamber and port is also defined within the housing for each chamber. An external pump can be to the housing.

1 Claim, 2 Drawing Sheets

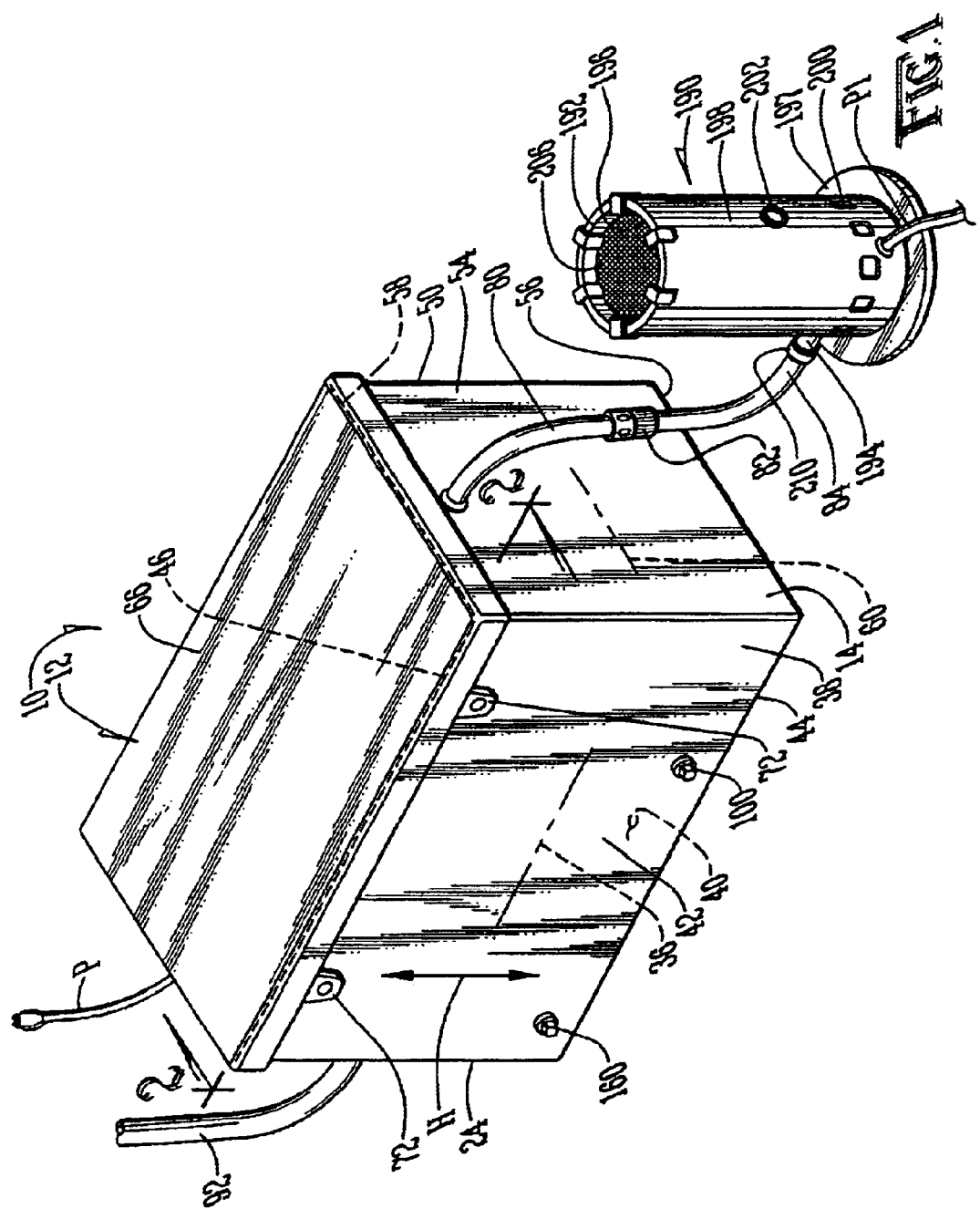

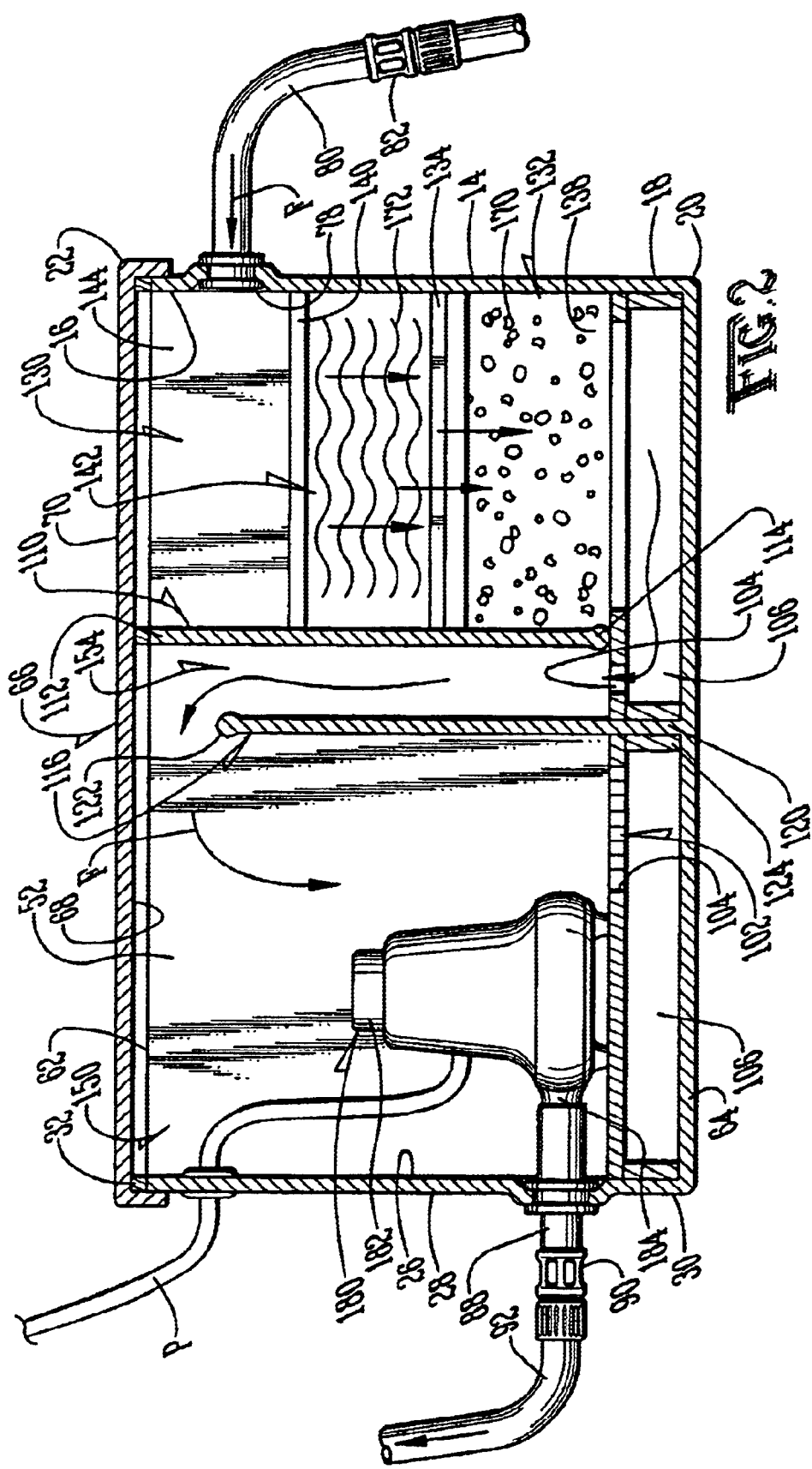

SEALED FILTRATION SYSTEM

BACKGROUND OF THE INVENTION

1. Field of the Invention

The present invention relates to the general art of filters, and to the particular field of filters for liquids.

2. Discussion of the Related Art

Bodies of water play an important part in modern life. Bodies of water are used for decorative purposes in gardens and ponds, for industrial purposes in fish hatcheries, ranching, industrial recycling, and even in municipal water supplies as well as for recreational purposes in camping and military purposes.

While extremely useful, most of these bodies of water must be maintained to prevent contamination of the water. This is especially true if the water is to be consumed. However, it is also necessary to maintain a body of water contamination free to prevent formation of insect breeding areas.

Therefore, there is a need for a filter unit system which can be used on a large body of water such as a pond, that is also adaptable for use on smaller bodies of water.

Since many homeowners use ponds as decoration, any filter system should be easy to set up and maintain. Otherwise, many filter systems will become ineffective due to improper maintenance.

Many homeowners also use well water which they may wish to purify. In fact, some homeowners may even wish to further purify municipality-supplied water. To this end, some homeowners have filtration systems for their drinking water. Such filter systems also must be properly maintained.

Therefore, there is a need for a sealed filtration system that is easy to set up and maintain.

Furthermore, if a body of water is to be used for decorative purposes, such as in landscaping, the system used to maintain that body of water should not be conspicuous. That is, it may detract from the overall aesthetic appeal of such a decorative body of water if a filter unit is located where it can be seen. On the other hand, locating a filter unit in an inconspicuous location may require conduits to be buried and pumps to be sufficiently powerful to move water great distances. Thus, at present, in order to preserve aesthetics, a filter system may be quite expensive and complicated to install.

Therefore, there is a need for a sealed filtration system that can be set up in an effective location yet will be inconspicuous and still be cost effective.

Many bodies of water have several types of contaminants including both physical particles both large and small, as well as biological and industrial contaminants. Therefore, to be fully effective, a filter system must be amenable to removing a wide variety of contaminants and end user adaptable.

Therefore, there is a need for a sealed filtration system that is adaptable for use with a wide variety of contaminants.

Camping is a very popular activity. Often campers need to purify available water to be potable. While there are a number of water purifying kits on the market, these kits often are not amenable to removing a wide variety of contaminants, including large and small physical particles as well as biological contaminants. The military also has similar needs.

Therefore, there is a need for a sealed filtration system that is amenable to being easily transported yet is capable of removing a wide variety of contaminants from the water.

PRINCIPAL OBJECTS OF THE INVENTION

It is a main object of the present invention to provide an efficient sealed filtration system that is amenable to use in conjunction with a wide variety of bodies of water.

It is another object of the present invention to provide a sealed filtration system that can efficiently remove a large variety of contaminants from water.

It is another object of the present invention to provide a sealed filtration system that is easily adaptable for use with a wide variety of filter media as dictated by the contaminants present in the water.

It is another object of the present invention to provide a sealed filtration system that is easily set up and maintained.

It is another object of the present invention to provide a sealed filtration system that is portable.

It is another object of the present invention to provide a sealed filtration system that can be used to purify well water, or industrial water, or water for camping, or water that is to be potable.

It is another object of the present invention to provide a sealed filtration system that can be set up in an effective location yet be inconspicuous.

It is another object of the present invention to provide a sealed filtration system that can be set up in an effective location yet be inconspicuous and still be cost effective.

It is another object of the present invention to provide a sealed filtration system that can be used on either, or both, large and small bodies of water and is adaptable with placement either in or out of the water.

SUMMARY OF THE INVENTION

These, and other, objects are achieved by a sealed filtration system which can be either submersible or non-submersible, a housing having two chambers which can house a variety of different filter media in a first chamber, and which is easily assembled, as well as a drain chamber in each chamber which is easily drained. The housing also contains a second chamber in which submersible pump can be placed, or a connection established to an external pump, which also can allow for two chambers of filter media, should this option be desired. The unit is end user adaptable The sealed filtration system of the present invention is thus easily assembled and disassembled, easily maintained, versatile, and can easily be adapted to remove a wide variety of different contaminants from a body of water. The sealed filtration system of the present invention is portable and can be submersed so it can be positioned in an inconspicuous location yet will not require complex conduits to function properly. The sealed filtration system is easily adapted for use with either or both large and small bodies of water and can provide nearly any degree of purity desired by merely adding or changing pumps and/or filter media.

BRIEF DESCRIPTION OF THE DRAWING FIGURES

FIG. 1 is a perspective view of a sealed filtration system embodying the present invention.

FIG. 2 is a cross-sectional view taken along line 2—2 of the sealed filtration system shown in FIG. 1.

DETAILED DESCRIPTION OF THE INVENTION

Other objects, features and advantages of the invention will become apparent from a consideration of the following detailed description and the accompanying drawings.

Referring to FIGS. 1 and 2, it can be understood that the present invention is embodied in a sealed filtration system 10 which comprises a sealed housing 12 that is portable and which can be used in large and/or small bodies of water. The submersible/nonsubmersible nature of the housing 12 makes it inconspicuous in use. Housing 12 includes a first end wall 14 having an inner surface 16 and an outer surface 18, a bottom rim 20 and a top rim 22. A second end wall 24 has an inner surface 26 and an outer surface 28, a bottom rim 30 and a top rim 32. End walls 14 and 24 are parallel with each other and co-extensive. A longitudinal axis 36 extends between the first end wall 14 and the second end wall 24 and defines a length dimension for the housing 12. Housing 12 further includes a first side wall 38 having an inner surface 40 and an outer surface 42, a bottom rim 44 and a top rim 46. Housing 12 further includes a second side wall 50 having an inner surface 52 and an outer surface 54, a bottom rim 56 and a top rim 58. The side walls 38, 50 are also parallel with each other and are coextensive with each other.

A transverse axis 60 extends between the first side wall 38 and the second side wall 50 and a width dimension for housing 12 is defined along the transverse axis 60. The top rims 22, 32, 46, 58 of the first end wall 14, the second end wall 24, the first side wall 38 and the second side wall 50 are all coplanar with each other and together define a housing top rim 62. The bottom rims 20, 30, 44, 56 of the first end wall 14, the second end wall 24, the first side wall 38 and the second side wall 50 are all coplanar with each other and together define a housing bottom rim 64. A height dimension H extends between the housing top rim 62 and the housing bottom rim 64.

A housing top 66 has an inner surface 68 and an outer surface 70 and is supported on the housing top rim 62 when covering the housing 12. Housing top 66 is removable to provide access to the interior volume of the housing 12 as will be understood from the following disclosure. When in place, top 66 seals the housing 12 so fluid cannot bypass the fluid filter circuit of the system by entering the housing 12 between the top 66 and the rest of the housing 12.

A lock system 72 is located on the outside surface 42 of the first side wall 38 and on the housing top 66 and locks the housing top 66 to the first side wall 38 when the housing top 66 is in position on the housing 12. The lock 72 attaches the housing top 66 to the side and end walls 14, 24, 38, 50 in a watertight manner.

An inlet port 78 is defined through the first end wall 14 adjacent to the top rim 22 of the first end wall 14. A fluid conduit 80 is fluidically connected to the inlet port 78 and a quick disconnect joint 82 is fluidically connected to the inlet port 78 via fluid conduit 80. A further fluid conduit 84 is also connected to the quick disconnect joint 82 for a purpose that will be understood from the following discussion.

An outlet port 86 is defined through the second end wall 24 adjacent to the bottom rim 30 of the second end wall 24. A fluid conduit 88 is fluidically connected to the interior of the housing 12 via the outlet port 86 and a quick disconnect joint 90 is fluidically connected to the outlet port 86 via fluid conduit 88. A further fluid conduit 92 is fluidically connected to quick disconnect joint 90. As will be understood from the teaching of the present disclosure, fluid flows into the interior of the housing 12 via the inlet port 78 and the associated fluid conduits and then flows out of the interior of the housing 12 via the outlet port 86 and the fluid conduits associated with the outlet port 86.

A plurality of drain ports 100 are defined through the first side wall 38 adjacent to the bottom rim 44 of the first side wall 38. The drain ports 100 are spaced apart from each other along the longitudinal axis 36 of the housing 12.

A grate 102 is located adjacent to the inner surface of the bottom wall and is spaced apart from the inner surface of the bottom wall along the height dimension H of the housing 12. The grate 102 has a multiplicity of liquid drain holes 104 defined there-through and is attached to the inner surface 16 of the first end wall 14, to the inner surface 26 of the second end wall 24, to the inner surface 40 of the first side wall 38 and to the inner surface 52 of the second side wall 50 to be supported in position on the housing 12.

A collection chamber 106 is defined between the grate 102 and the inner surface of the bottom of the housing 12. The collection chamber 106 is fluidically connected to each of the drain ports 100 of the housing 12.

A first dividing wall 110 is located between the first end wall 14 and the second end wall 24 and is attached to the inner surface 40 of the first side wall 38 and to the inner surface 52 of the second side wall 50 and extends across the entire width of the housing 12 to divide the housing 12 as will be understood from the following discussion. The first dividing wall 110 has a top end 112 which is coplanar with the housing top rim and a bottom end 114 which located closely adjacent to the grate 102 and is superadjacent to the collection chamber 106.

A second dividing wall 116 is located between the second end wall 24 and the first dividing wall 110 and is spaced apart from the first dividing wall 110 along the longitudinal axis 36 of the housing 12. Second dividing wall 116 is attached to the inner surface 40 of the first side wall 38 and to the inner surface 52 of the second side wall 50 to extend completely across the width of the housing 12. The second dividing wall 116 has a bottom end 120 fixed to the inner surface of the bottom wall of the housing 12 and a top end 122 spaced apart from the top rim 62 of the housing 12. Top end 122 of second dividing wall 116 is located between the top rim 62 of the housing 12 and the bottom rim 64 of the housing 12 and extends through the grate 102 and forms a wall 124 in the collection chamber 106. Wall 124 is impervious to fluid and drain ports 100 are located on both sides of wall 124 so chamber 106 can be fully drained.

A flow chamber 130 is located between the first dividing wall 110 and the second dividing wall 116 and extends from the grate 102 adjacent to the bottom end 114 of the first dividing wall 110 to the top 122 of the second dividing wall 116. A first filter chamber 132 is located between the inside surface 16 of the first end wall 14 and the first dividing wall 110 and between the grate 102 and the housing top rim 62. First filter chamber 132 includes a first liquid permeable filter-supporting shelf 134 fixed to the first dividing wall 110 and to the inside surface 16 of the first end wall 14 and to the inside surface 40 of the first side wall 38 and to the inside surface 52 of the second side wall 50. First filter-supporting shelf 134 is spaced apart from the grate 102 along the height dimension H of the housing 12 and extends in a direction which is parallel to the grate 102. A first filter media-containing chamber 138 is defined between the first filter supporting shelf 134 and the grate 102 and between the first end wall 14 and the first dividing wall 110 and between the first side wall 38 and the second side wall 50. A second liquid permeable filter-supporting shelf 140 is fixed to the first dividing wall 110 and to the inside surface 16 of the first end wall 14 and to the inside surface 40 of the first side wall 38 and to the inside surface 52 of the second side wall 50. Second filter-supporting shelf 140 is spaced apart from the first filter-supporting shelf 134 toward the top rim 62 of the housing 12 along the height dimension H of the housing 12 and extends in a direction which is parallel to the first filter-supporting supporting shelf 134. The second filter-supporting shelf 140 is located immediately subadjacent to the inlet port 78 of the housing 12. A second filter media-containing chamber 142 is defined between the first filter-supporting shelf 134 and the second filter-supporting shelf 140 and between the first end wall 14 and the first dividing wall 110 and between the first side wall 38 and the second side wall 50.

A fluid inlet chamber 144 is defined between the second filter-supporting shelf 140 and the top rim 62 of the housing 12 and is fluidically connected to the inlet port 78 of the housing 12 to receive fluid therefrom.

A second filter chamber 150 is located between the inside surface 26 of the second end wall 24 and the second dividing wall 116 and between the grate 102 and the housing top rim 62.

First dividing wall 110 is spaced apart from second dividing wall 116 and defines therebetween a flow chamber 154 fluidically connecting the first filter chamber 132 to the second filter chamber 150 via drain holes 104 through the grate 102.

A drain plug 160 is removably mounted in each drain port 100.

First mechanical filter medium 170 is located in the first filter media-containing chamber 138 and a first biological filter medium 172 is located in the second filter media-containing chamber 142. Other forms of filter media can be used and both chambers can contain mechanical filter media, or both chambers can contain biological filter media, or the like without departing from the scope of the present disclosure as will be understood by those skilled in the art.

A submersible liquid pump 180 is located in the second filter chamber 150 and is supported on the grate 102. Pump 180 is powered from a power source via a cord P. Liquid pump 180 includes an inlet 182 which is fluidically connected to the second filter chamber 150 and an outlet 184 which is fluidically connected to the outlet port 86 of the housing 12.

An inlet pump system 190 is also included in the system 10 and includes an inlet 192 fluidically connected to a body of liquid to be filtered, an outlet 194 fluidically connected to the inlet port 78 of the housing 12, a filter chamber 196 fluidically interposed between inlet 192 of the inlet pump system 190 and outlet 194 of the inlet pump system 190. Power for pump system 190 is supplied via a cord P1 from a suitable power source. A base element 197 supports housing 198 of the inlet pump system 190. Ports 200 control flow through pump system 190 and ports 202 are also included to further control flow through pump system 190. A filter medium 206 is located in the filter chamber 196 of inlet pump housing 198. A fluid connection element 210 connects outlet 194 of inlet pump system 190 to conduit 84 and hence to quick disconnect joint 82 and to the inlet port 78 of the housing 12.

As indicated by flow arrows F in FIG. 2, flow enters housing 12 via inlet port 78 from pump system 190, flows through the various filter media where both physical and chemical impurities are removed, with the various filter media removing specific portions of the impurities, then into chamber 106 where sludge or the like is deposited to be removed via drain holes 100 during cleaning and/or servicing of the system 10, then via holes 104 in grate 102 to flow chamber 154 and over wall 116 into chamber 150 and then to pump 180 and via pump 180 to outlet port 86. Further sludge or large particles can settle through grate 102 via the holes 104 in the grate 102 into chamber 106 for later removal via drain ports 100. Pump 180 works in conjunction with pump system 190 to move liquid into and through housing 12 in the manner just described whereby impurities are removed from that liquid before it is discharged via housing outlet port 86 and conduit 92.

Whereas most filter systems use high pressure to pump fluid through a media, the system of the present invention pulls the fluid across a media substantially similar to the manner in which a natural aquafer system uses the earth to purify water. In other words, the system of the present invention uses fluid flow rate over media, not pressure through media, to remove contaminants.

It is understood that while certain forms of the present invention have been illustrated and described herein, it is not to be limited to the specific forms or arrangements of parts described and shown.

What is claimed and desired to be covered by letters patent is:

1. A filter unit system comprising:
    a) a sealed housing which can be submerged includes
        (1) a first end wall having an inner surface and an outer surface, a bottom rim and a top rim,
        (2) a second end wall having an inner surface and an outer surface, a bottom rim and a top rim,
        (3) a longitudinal axis extending between the first end wall and the second end wall,
        (4) a first side wall having an inner surface and an outer surface, a bottom rim and a top rim,
        (5) a second side wall having an inner surface and an outer surface, a bottom rim and a top rim,
        (6) a transverse axis extending between the first side wall and the second side wall,
        (7) the top rims of the first end wall, the second end wall, the first side wall and the second side wall all being coplanar with each other and together defining a housing top rim,
        (8) the bottom rims of the first end wall, the second end wall, the first side wall and the second side wall all being coplanar with each other and together defining a housing bottom rim,
        (9) a height dimension extending between the housing top rim and the housing bottom rim,
        (10) a housing top having an inner surface and an outer surface and supported on the housing top rim when covering said housing,
        (11) a lock on the outside surface of the first side wall and on the housing top which locks the housing top to the first side wall when in position on said housing, the lock attaching the housing top to the side and end walls in a watertight manner,
        (12) an inlet port defined through the first end wall adjacent to the top rim of the first end wall,
        (13) a quick disconnect joint associated with the inlet port,
        (14) an outlet port defined through the second end wall adjacent to the bottom rim of the second end wall,
        (15) a quick disconnect joint associated with the outlet port,
        (16) a plurality of drain ports defined through the first side wall adjacent to the bottom rim of the first side wall, the drain ports being spaced apart from each other along the longitudinal axis of said housing,
        (17) a grate located adjacent to the inner surface of the bottom wall and being spaced apart from the inner surface of the bottom wall along the height dimension of said housing, the grate having a multiplicity of liquid drain holes defined therethrough, the grate being attached to the inner surface of the first end wall, to the inner surface of the second end wall, to the inner surface of the first side wall and to the inner surface of the second side wall,

(18) a collection chamber defined between the grate and the inner surface of the bottom of said housing, the collection chamber being fluidically connected to each of the drain ports of said housing,

(19) a first dividing wall located between the first end wall and the second end wall and being attached to the inner surface of the first side wall and to the inner surface of the second side wall, the first dividing wall having a top end coplanar with the housing top rim and a bottom end located closely adjacent to the grate and superadjacent to the collection chamber,

(20) a second dividing wall located between the second end wall and the first dividing wall and being spaced apart from the first dividing wall, the second dividing wall being attached to the inner surface of the first side wall and to the inner surface of the second side wall, the second dividing wall having a bottom end fixed to the inner surface of the bottom wall of said housing and a top end spaced apart from the top rim of said housing and being located between the top rim of said housing and the bottom rim of said housing and extending through the grate,

(21) a dividing wall in the collection chamber formed by the second dividing wall, the dividing wall in the collection chamber being impervious to fluid,

(22) a flow chamber located between the first dividing wall and the second dividing wall and extending from the grate adjacent to the bottom end of the first dividing wall to the top of the second dividing wall,

(23) a first filter chamber located between the inside surface of the first end wall and the first dividing wall and between the grate and the housing top rim, the first filter chamber including (A) a first liquid permeable filter-supporting shelf fixed to the first dividing wall and to the inside surface of the first end wall and to the inside surface of the first side wall and to the inside surface of the second side wall, the first filter-supporting shelf being spaced apart from the grate along the height dimension of said housing and extending in a direction which is parallel to the grate, (B) a first filter media containing chamber defined between the first filter supporting shelf and the grate and between the first end wall and the first dividing wall and between the first side wall and the second side wall, (C) a second liquid permeable filter-supporting shelf fixed to the first dividing wall and to the inside surface of the first end wall and to the inside surface of the first side wall and to the inside surface of the second side wall, the second filter-supporting shelf being spaced apart from the first filter-supporting shelf toward the top rim of said housing along the height dimension of said housing and extending in a direction which is parallel to the first filter-supporting shelf, the second filter-supporting shelf being located immediately subadjacent to the inlet port of said housing (D) a second filter media containing chamber defined between the first filter supporting shelf and the second filter-supporting shelf and between the first end wall and the first dividing wall and between the first side wall and the second side wall, and (E) a fluid inlet chamber defined between the second filter-supporting shelf and the top rim of said housing and being fluidically connected to the inlet port of said housing,

(24) a second filter chamber located between the inside surface of the second end wall and the second dividing wall and between the grate and the housing top rim, the flow chamber fluidically connecting the first filter chamber to the second filter chamber, and

(25) a drain plug removably mounted in each drain port;

b) a first mechanical filter medium located in the first filter media containing chamber;

c) a first biological filter medium located in the second filter media containing chamber;

d) a submersible liquid pump located in the second filter chamber and supported on the grate, said liquid pump including an inlet which is fluidically connected to the second filter chamber and an outlet which is fluidically connected to the outlet port of said housing; and e) an inlet pump system which includes
(1) an inlet fluidically connected to a body of liquid to be filtered,
(2) an outlet fluidically connected to the inlet port of said housing,
(3) a filter chamber fluidically interposed between the inlet of said inlet pump system and the outlet of said inlet pump system,
(4) a filter medium in the filter chamber of said inlet pump housing,
(5) a weighted base, and
(6) a fluid connection element connecting the outlet of said inlet pump system to the inlet port of said housing.

* * * * *